May 25, 1965 R. W. RATTE 3,184,880
LINE ATTACHMENT AND SAFETY DEVICE FOR FISHING TACKLE
Filed Nov. 30, 1961
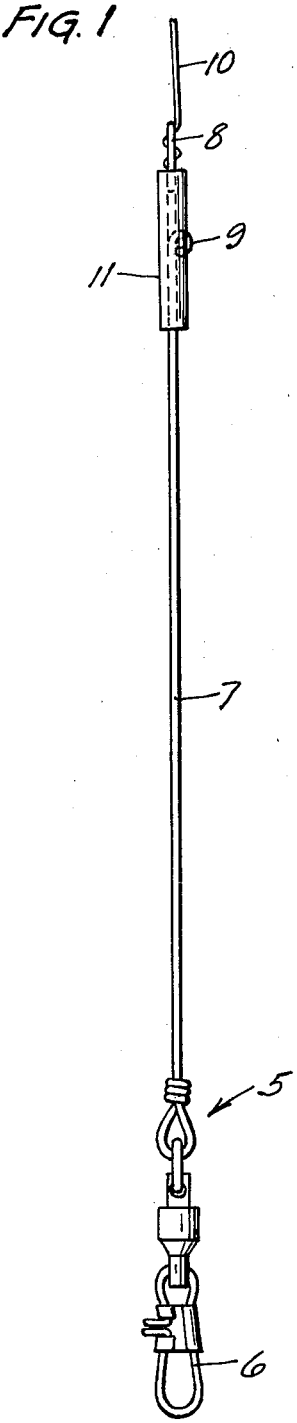
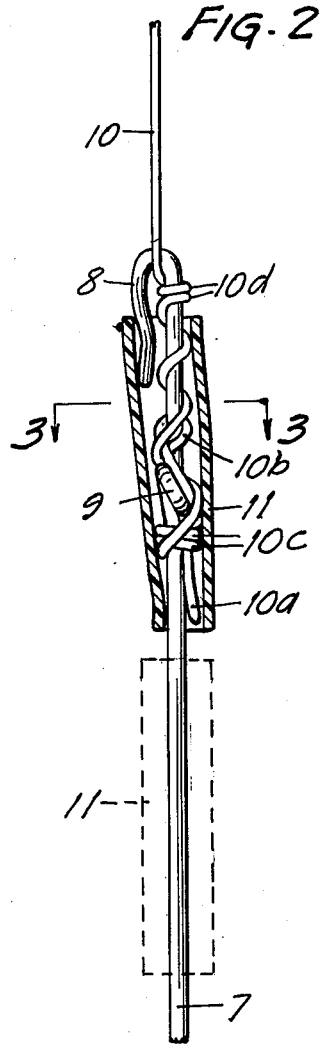
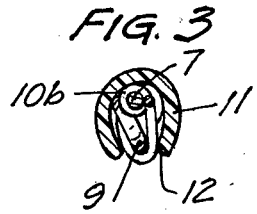
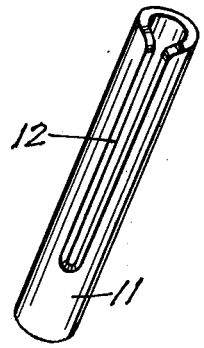
INVENTOR
ROBERT W. RATTE
BY John E. Stryker
ATTORNEY 3,184,880
LINE ATTACHMENT AND SAFETY DEVICE FOR FISHING TACKLE
Robert W. Ratte, White Bear Lake, Minn., assignor to Water Gremlin Company, White Bear Lake, Minn., a corporation of Minnesota
Filed Nov. 30, 1961, Ser. No. 155,981
3 Claims. (Cl. 43—44.86)

This invention relates to improvements in fishing tackle and particularly to improved means for fastening hooks, lures and leaders to fish lines or leaders.

It is an object of my invention to provide a novel line fastening device which facilitates the fastening operation, reduces line breakage and includes an elongated tubular guard which is slidable along the terminal shank portion of the fishing tackle from a retracted position, wherein the terminal shank portion is uncovered for attachment of the line thereto, to a line-fastening position in which the terminal shank portion and portion of the line attached thereto are confined and protected within the tubular guard.

A further and particular object is to provide a line-fastening device of the class described, comprising a terminal shank portion of the tackle, having one or more projecting members, and an elongated tubular guard slidable along said shank portion to a position in which the projecting members and the line attached thereto are confined within the guard so that the latter may be used as a handle in landing or boating heavy fish which have been hooked, and in removing the hooks from the fish.

The invention also includes certain other novel features of construction which will be more fully pointed out in the following specification and claims.

Referring to the accompanying drawing which illustrates, by way of example and not for the purpose of limitation, a preferred embodiment of my invention:

FIGURE 1 is a side elevational view showing one of my devices connected to a fishing tackle leader of common type;

FIG. 2 is an enlarged longitudinal sectional view of my tubular guard in line-fastening position on the terminal shank portion and line connected thereto, shown in elevation;

FIG. 3 is a horizontal sectional view taken on the line 3—3 of FIG. 2, and

FIG. 4 is a detail perspective view of the tubular guard separate from the tackle and line.

In the drawing, a fishing tackle leader of common type is indicated generally by the numeral 5. The normally lower end of this leader is fitted with a swivel terminal and coupling member 6 to which lures, bait, hooks or other tackle may be readily connected. The leader has an elongated shank 7 which is preferably formed from fine stainless steel wire. The normally upper end of the shank 7 is formed with a downwardly open hook member 8, and spaced downwardly from the hook member is a laterally projecting member 9 to which a fish line 10 may be fastened, as hereinafter described.

An elongated tubular guard indicated generally by the numeral 11 is mounted as a sleeve embracing the shank 7 and is slidable along the shank from a retracted position, in which the terminal portion of the shank is exposed, to a line-fastening position, such as that indicated in FIG. 2. This guard member 11 is open at both ends and is formed with a longitudinally extending slot 12 extending downwardly from its normally upper end to a point substantially above its lower end. The guard 11 is formed from somewhat flexible and elastic material and its internal diameter is such as to cause at least the upper end portion of the guard to be expanded by the shank members when moved to its line fastening position. The tubular guard may be formed, for example, from plastic materials such as polyethylene, nylon, polytetrafluoroethylene, polypropylene, or a suitable vinyl, or from a suitable rubber or rubber-like composition.

With the guard 11 in a retracted position such as that indicated in broken lines in FIG. 2, the line 10 may be fastened to the shank 7 by any suitable or preferred method. To avoid tying a knot in the line or other type of connection tending to weaken the line, I prefer to fasten it to the shank by a method wherein a portion of the shank below the projecting member 9 and the free end portion 10a of the line are grasped in one hand, while the line above the end portion is wound around the shank in a unidirectional manner. A few turns or convolutions 10b of the line are wound above the projecting member 9, then the line is wound in the same direction for a few turns around the shank directly below the projection 9, as indicated at 10c. This is followed by a plurality of additional turns, preferably five or more, wound around the shank above the member 9, as shown in FIG. 2. The final turns indicated at 10d are pulled up into the bight of the hook member 8 where they are confined. When tension is placed on the line, the several convolutions embracing the shank are drawn tight and the hook member 8 prevents the line from unwinding when it is under tension.

The line 10 may be of ordinary woven fiber type or of the monofilament type which tends to spring out of its tightly wound engagement with the hook member 8, when slack, and under some conditions of use. Such disengagement of the line from the terminal end of the shank 7 is prevented, however, by my tubular guide which closes the lower open side of the hook when the guard is in the line fastening position. Moreover, when in this position the guard grips the projecting member 9 at opposite sides in the slot 12 and prevents the convolutions of the line from springing out of engagement with the member 9. The guard also frictionally engages a number of the convolutions of the line to hold them in frictional contact with the shank 7, thereby distributing the stress under tension and minimizing breakage of the line at its fastening to the tackle shank. When in use, the lower end of the slot 12 is engaged by the projecting member 9 to prevent the guard 11 from being withdrawn upwardly even when under severe stress, as when being grasped as a handle, in the landing of a heavy fish which has been hooked. It will be evident from FIGS. 1 and 2 that the length of the slot 12 is greater than the distance between the open end of the hook member 8 and the lower side of the projecting member 9.

The laterally projecting member 9 preferably consists of a 360° loop formed in the shank 7 and extending along and laterally from the shank to provide a hitch member around which convolutions of the line may be snubbed. Other forms of hitch abutments or eyes may be provided for connection with the line without departing from the present invention. The shank portion 7 of the tackle to which the line is to be connected is preferably constructed from wire such as stainless steel wire having adequate stiffness to retain its shape as well as strength and suitable resiliency and corrosion resistance.

When the line is to be disconnected from the tackle shank, the tubular guide 11 is merely pushed down along the shank 7 so that the line may be detached in the usual manner. It will be evident that the tubular guard 11 does not add materially to the cost of the tackle. When the fishing tackle is in use, the tubular guard 11 provides a convenient handle at the upper end of a leader, fish hook or other tackle which protects the hand of the fisherman from injury which might otherwise be caused by the open end of the hook member 8, or by the laterally projecting member 9. This safety feature is particularly useful when a heavy fish has been hooked and must be lifted out of the water to the boat or landing, and during the removal of the hook from the fish. Among other important advantages derived from the use of my device is the increased security of the fastening between the line and tackle shank, minimizing localized stress tending to break the line at the point of fastening, and the protection afforded against snagging the hook member 8 or projecting member 9 on weeds or other obstructions encountered in casting and trolling.

I claim:

1. The combination of a fishing tackle member having a terminal shank portion formed with a downwardly open hook-shaped member on its normally upper end and a laterally projecting member spaced downwardly from said hook-shaped member for connection with a fish line, and a resilient flexible tubular guard slidable along said shank portion from a retracted position, wherein said hook-shaped member and projecting member are uncovered for attachment of the line thereto, to a line-fastening position in which said tubular guard closes said hook-shaped member, and said portion of the line attached to said shank portion is confined within the resilient grip of said tubular guard, said guard being formed with an elongated slot extending downwardly from its normally upper end to a point substantially above its lower end, the surfaces defining the lateral sides of said slot being disposed to receive said laterally projecting member between them when the guard is in line-fastening position and said slot having a length greater than the distance between the open end of said hook shaped member and the lower side of said projecting member.

2. A combination in accordance with claim 1 including a fish line attached to said terminal shank portion by a plurality of convolutions of said line wound on said terminal shank portion above and below said laterally projecting member, said tubular guard being sufficiently flexible and elastic and of such internal diameter as to fit in gripping frictional engagement with said convolutions of the line wound on said shank portion when in said line-fastening position.

3. A combination in accordance with claim 1 in which the surface defining the lower end of said slot is disposed to engage the lower side of said projecting member when the guard is in line-fastening position.

References Cited by the Examiner
UNITED STATES PATENTS

| | | | |
|---|---|---|---|
| 2,229,849 | 1/41 | Heidebrecht. | |
| 2,463,116 | 3/49 | Lewis. | |
| 2,601,351 | 6/52 | Wilburn | 287—108 |
| 2,674,824 | 4/54 | Werner | 43—44.83 |
| 2,952,206 | 9/60 | Becksted | 174—93 |
| 2,984,882 | 5/61 | Winn | 43—44.83 X |

SAMUEL KOREN, *Primary Examiner.*

ABRAHAM G. STONE, *Examiner.*